United States Patent
Ferguson et al.

(10) Patent No.: US 7,609,713 B2
(45) Date of Patent: Oct. 27, 2009

(54) ASSOCIATING A SIGNAL MEASUREMENT WITH A COMMUNICATION DEVICE ON A NETWORK

(75) Inventors: Anthony D. Ferguson, Watertown, MN (US); Brian A. Franchuk, Richfield, MN (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 569 days.

(21) Appl. No.: 11/238,670

(22) Filed: Sep. 29, 2005

(65) Prior Publication Data

US 2007/0073867 A1    Mar. 29, 2007

(51) Int. Cl.
*H04L 12/42* (2006.01)
(52) U.S. Cl. .................. 370/450; 370/245; 710/107
(58) Field of Classification Search .................. None
See application file for complete search history.

(56) References Cited

U.S. PATENT DOCUMENTS

| | | | | |
|---|---|---|---|---|
| 5,980,078 A | * | 11/1999 | Krivoshein et al. .......... 700/1 |
| 6,377,859 B1 | * | 4/2002 | Brown et al. .................. 700/79 |
| 6,424,872 B1 | * | 7/2002 | Glanzer et al. ................ 700/18 |
| 6,594,530 B1 | * | 7/2003 | Glanzer et al. ................ 700/18 |
| 6,915,364 B1 | * | 7/2005 | Christensen et al. ........ 710/104 |
| 6,999,824 B2 | * | 2/2006 | Glanzer et al. ................ 700/18 |
| 2004/0194101 A1 | * | 9/2004 | Glanzer et al. .............. 718/100 |
| 2004/0213285 A1 | * | 10/2004 | Stevenson et al. ........... 370/465 |

OTHER PUBLICATIONS

Product Specification, Foundation™ Fieldbus from Relcom Inc.

* cited by examiner

*Primary Examiner*—Bob A Phunkulh
(74) *Attorney, Agent, or Firm*—Kinney & Lange, P.A.

(57) ABSTRACT

A signal measured on a network is associated with one of a plurality of communication devices connected to the network. The designation address of an active communication device that is scheduled to communicate next is determined. The next received signal on the network is associated with the designation address of the active communication device if the signal is received within a maximum response time.

20 Claims, 5 Drawing Sheets

ASSOCIATING A SIGNAL MEASUREMENT WITH A COMMUNICATION DEVICE ON A NETWORK

BACKGROUND OF THE INVENTION

The present invention relates to network devices and network signals. In particular, the present invention is a method and device for associating a signal measured on a network with a communication device connected to the network.

In a typical industrial plant, a distributed control system (DCS) is used to control many of the industrial processes performed at the plant. Typically, the plant has a centralized control room having a computer system with user input/output (I/O), disc I/O, and other peripherals as are known in the computing art. Coupled to the computing system are a controller and a process I/O subsystem.

The process I/O subsystem includes I/O ports which are connected to various field devices throughout the plant. Field devices include various types of analytical equipment, silicon pressure sensors, capacitive pressure sensors, resistive temperature detectors, thermocouples, strain gauges, limit switches, on/off switches, flow transmitters, pressure transmitters, capacitance level switches, weigh scales, transducers, valve positioners, valve controllers, actuators, solenoids, and indicator lights. The term "field device" encompasses these devices, as well as any other device that performs a function in a distributed control system.

Fieldbus is a multi-drop serial digital two-way communications protocol intended for connecting field instruments and other process devices such as monitoring and simulation units in distributed control systems. Fieldbus allows enhanced digital communication over previous process control loop methods while maintaining the ability to power process devices coupled to the Fieldbus loop and while meeting intrinsic safety requirements.

Two reasonably standardized industrial Fieldbus protocols are Foundation Fieldbus and Profibus. The physical layer of the Fieldbus protocols are defined by Instrument Society of America (ISA) standard ANSI/ISA-50.02-1992, and its draft two extension dated 1995. The Fieldbus protocol defines two subprotocols. An H1 Fieldbus network transmits data at a rate up to 31.25 kilobits per second (Kbps) and provides power to field devices coupled to the network. The H1 physical layer subprotocol is defined in Clause 11 of Part 2 of the ISA standard, approved in September 1992. An H2 Fieldbus network transmits data at a rate up to 2.5 megabits per second (Mbps), does not provide power to field devices connected to the network, and is provided with redundant transmission media.

The signals sent by devices communicating on a network may be used to indicate whether the devices are operating normally. For instance, certain signal measurements, such as a signal's amplitude, aid in diagnosing a problem with one of the communicating devices. Traditionally, an oscilloscope is used to measure the signals of devices communicating on the network. However, these signals cannot easily be associated with the devices of origin using an oscilloscope, which makes it difficult not only to track the devices currently communicating on the network, but also to identify which device has a problem.

BRIEF SUMMARY OF THE INVENTION

A signal measured on a network is associated with one of a plurality of communication devices connected to the network. The designation address of an active communication device that is scheduled to communicate next on the network is determined. The next received signal on the network is associated with the designation address of the active communication device if the next received signal is received within a maximum response time.

DETAILED DESCRIPTION

Process Control System Overview

The Fieldbus physical layer defines the electrical characteristics of the physical means of transmission and reception of the communications protocol data in the form of a Physical Layer Protocol Data Unit (PhPDU). In addition, the Fieldbus physical layer specifies the symbol encoding, message framing, and error detection method. The ISA Fieldbus standard defines three signaling speeds and two modes of coupling. For purposes of this description, a process control system will be described in the context of the H1 physical layer defined in Clause 11 of ISA standard ANSI/ISA-50.02, Part 2-1992. That clause covers a 31.25 Kbps, voltage mode, wire medium, with a low-power option. This option allows for a device connected to the communications medium to receive its operational power from the communications medium. The physical layer can be capable of meeting the intrinsic safety requirements for hazardous environments. The protocol operates on low-grade twisted pair cable and supports multiple devices, in accordance with the voltage and current limitations which are defined by the standard.

Figure 1:
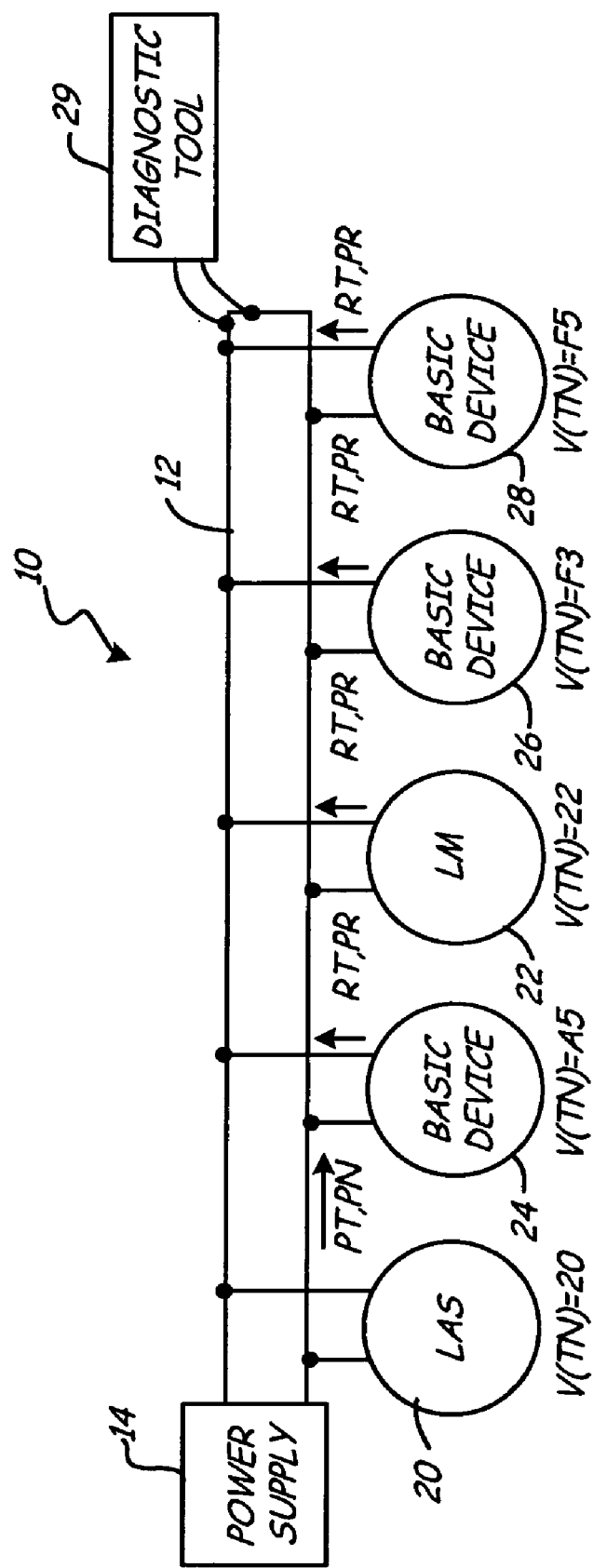
FIG. 1 is a diagram of a process control system with digital communication between devices over a communication medium segment and an attached diagnostic tool.

FIG. 1 shows a typical process control system 10 including segment 12, power supply 14, and five devices: Link Active Scheduler (LAS) 20, Link Master (LM) device 22, and basic devices 24, 26, and 28. FIG. 1 also shows diagnostic tool 29 attached to segment 12. Segment 12 can support up to thirty-two devices on a single pair of wires. Typically, segment 12 will have from four to sixteen devices, based on loop execution speed, power, and intrinsic safety requirements.

LAS 20 maintains a central schedule for all communications between devices on segment 12. LAS 20 improves the overall communication reliability by sending Compel Data (CD) Data Link Protocol Data Units (DLPDUs) to each device to transmit back cyclic data. LAS 20 updates the central schedule based on which devices are required to respond to a CD DLPDU. LAS 20 serves as the local source of Data Link time (DL-time) on segment 12. A DLPDU is the data content of the PhPDU message that is communicated across segment 12.

LM device 22 is configured to take over the responsibilities of LAS 20 should LAS 20 fail or become inoperable. Although only LM device 22 is shown in FIG. 1, more than one Link Master device can be present on a segment. This allows for the case if both the Link Active Scheduler and the first Link Master were to fail, then the second Link Master can take over for the Link Active Scheduler. Once the Link Active Scheduler is disabled, the Link Master takes over the functionality of the Link Active Scheduler.

Each device has a unique address called the V(TN), which represents the local node-ID (This_Node). In the example shown in FIG. 1, LAS 20 has an address V(TN)=20; LM device 22 has address V(TN)=22; basic device 24 has address V(TN)=A5; basic device 26 has address V(TN)=F3; and basic device 28 has address V(TN)=F5.

LAS 20 sends Pass Token (PT) and Probe Node (PN) messages to all devices on segment 12. Each of the other devices (LM device 22 and basic devices 24, 26, 28) send Return Token (RT) and Probe Response (PR) messages back to LAS 20, as appropriate.

Each basic device 24, 26, 28 only needs to see its own PT and PN messages that are sent by LAS 20. PT and PN messages have a designation address (DA) encoded in the second byte of the DLPDU. LAS 20 passes a token (PT) or probes a node (PN) one at a time to all devices on segment 12.

Once basic device 24, 26, or 28 receives a PT message with a designation address equal to that device's unique address (DA=V(TN)), it then will respond back to LAS 20 with an RT message. If basic device 24, 26, or 28 receives a PN DLPDU with DA=V(TN), it is required to respond back with a PR message.

The transmission of PT and PN messages from LAS 20 and RT and PR messages to LAS 20 creates several messages on segment 12 that a particular basic device 24, 26, 28 does not need to receive and take action on. Each basic device 24, 26, 28 only needs to respond to PT and PN messages addressed to that particular device. Constantly getting interrupted by PT and PN messages from LAS 20 that are addressed to other devices, as well as RT and PR messages from other devices addressed to LAS 20, can create undue processing time to handle these "nuisance interrupts." With basic devices 24, 26, and 28, DLPDU filtering can be used to reduce the number of interrupts that the basic device has to process. On the other hand, LAS 20 must process every message on segment 12.

All devices on segment 12 transmit data onto segment 12 as a Manchester encoded baseband signal. With Manchester encoding, "0" and "1" are represented by transitions that occur from low-to-high and high-to-low, respectively, in the middle of the bit period. For Fieldbus, the nominal bit time is 32 microseconds (μsec), with the transition occurring at 16 μsec. The Manchester encoding rules have been extended to include two additional symbols, non-data plus (N+) and non-data minus (N−), wherein no transition occurs during the bit period and the Manchester encoded baseband signal remains high (N+) or low (N−).

Diagnostic tool 29 is attached to segment 12 by two conductive elements, such as wires or probes. One of the diagnostic capabilities of diagnostic tool 29 is to measure the amplitude of a device on segment 12. The amplitude is measured peak-to-peak (p-p), which is the difference between the maximum positive and the maximum negative amplitudes of a device signal. The amplitude of the device signal normally ranges from about 250 mV p-p to about 1.2 V p-p. If an amplitude measurement falls outside of this range, this measurement may indicate a problem with a device on segment 12.

As will be described in more detail with regard to FIGS. 3, 4, 5A, and 5B, diagnostic tool 29 associates the designation address of an active device on segment 12 with a next received signal measured on segment 12 if the next received signal is received within a maximum response time (based on network settings). In addition, diagnostic took 29 may use this information to maintain a list of all devices on segment 12 that are actively communicating on segment 12.

Message Format

Figure 2:
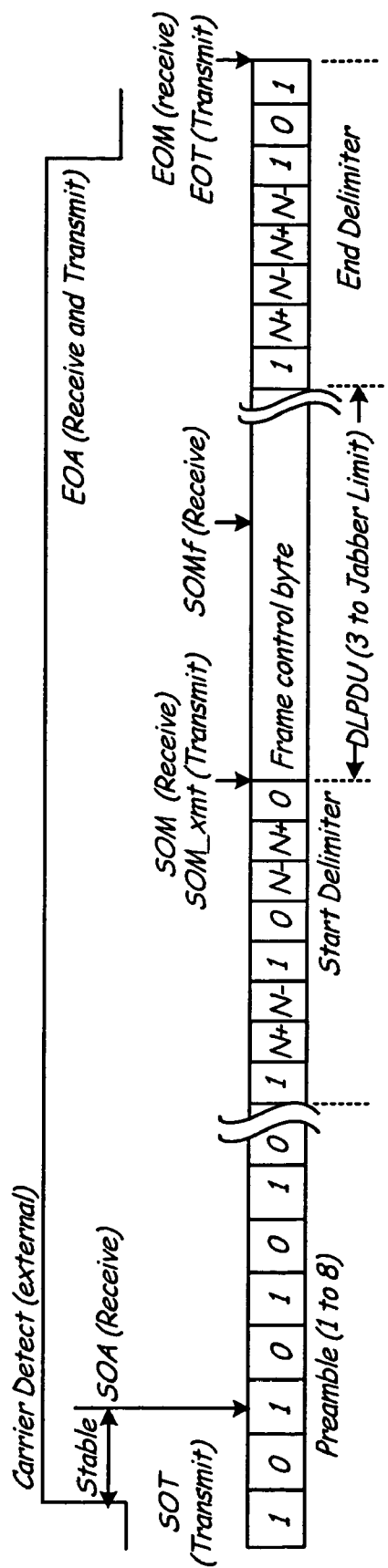
FIG. 2 shows a message format for communications between devices of the process control system of FIG. 1.

FIG. 2 shows the format of a Physical Layer Protocol Data Unit (PhPDU) used to transmit messages over segment 12. The PhPDU includes a preamble, a Start Delimiter (SD), a Data Link Protocol Data Unit (DLPDU), and an End Delimiter (ED). The preamble is the first several bits of the PhPDU message. The fieldbus specification allows for one to eight bytes of preamble. The device receiving the message uses the preamble to synchronize with the incoming message. As shown in FIG. 2, the sequence of the first byte of the preamble is 1 0 1 0 1 0 1 0.

The Start Delimiter (SD) immediately follows the preamble. There is one SD per message. The fieldbus specification requires that the SD have non-character data (N+ and N−), which always appear in the SD message in complementary pairs. This encoding scheme makes the SD unique and impossible to confuse with the data portion (DLPDU) of the message. The sequence shown in FIG. 2 for the SD is 1 N+ N− 1 0 N− N+ 0.

The DLPDU is a variable length message. It contains a Frame Control (FC) byte as its first byte and a Frame Check Sequence (FCS) check sum as its final two bytes. The length of DLPDU is variable, with a minimum of three bytes (in the case of an RT message) up to a jabber limit of, for example, about 300 bytes.

The End Delimiter (ED) follows the DLPDU. It represents the last byte of any PhPDU message transmitted over segment 12. Similar to the SD, the ED includes non-character data in complementary pairs. This encoding scheme makes the ED unique and impossible to confuse with the DLPDU. The sequence shown in FIG. 2 for the End Delimiter is 1 N+ N− N+ N− 1 0 1.

FIG. 2 also shows a Carrier Detect signal. The purpose of the Carrier Detect signal is to indicate when (a) an incoming PhPDU message is present on segment 12 or (b) a device is transmitting a message onto segment 12.

Start of Transmit (SOT) occurs at the moment that a Transmit Enable (TxE) goes active, i.e., when the preamble of a PhPDU message is first presented to segment 12.

Start of Activity (SOA) occurs after the Carrier Detect signal goes active and has been stable for at least one bit time or two bit times (approximately 16 to 32 μsec). This time depends on when the Carrier Detect goes active with respect to the internal clock of the device receiving the message. This allows the communication controller of the device to ignore noise glitches that are most apt to occur at the front end of the preamble. Additional time is used to synchronize with the bit boundaries to eliminate the potential for short noise bursts on segment 12 being misinterpreted as activity. For a transmitted message, SOA occurs once the Transmit Enable goes active (i.e., the preamble of the PhPDU is presented to segment 12).

Start of Message (SOM) occurs at the beginning of the first bit of when the FC byte is detected for a received message.

SOM_xmt is the Start of Message Transmit, which occurs at the beginning of the first bit of when the FC byte is detected for a transmitted message.

SOMf is an SOM of a received filtered DLPDU. This occurs when the communication controller within the device has detected enough information to make the determination that the incoming message is to be filtered.

End of Message (EOM) occurs at the end of the last bit of the ED being encountered in a received message. End of Transmission (EOT) occurs at the end of the last bit of the ED a transmitted message.

End of Activity (EOA) occurs when the Carrier Detect has gone inactive. The EOA occurs for both transmitted and received DLPDUs.

Diagnostic Tool 29

Figure 3:
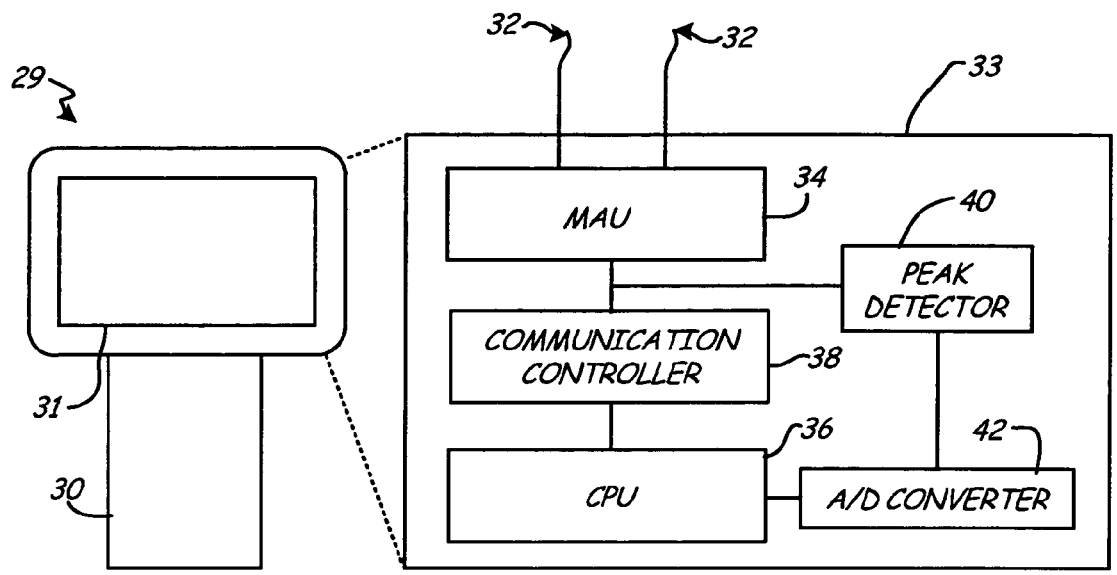
FIG. 3 is a block diagram of the architecture of the diagnostic tool shown in FIG. 1.

FIG. 3 is a block diagram of the architecture of diagnostic tool 29. Diagnostic tool 29 includes housing 30, liquid crystal display (LCD) 31, conductive elements 32, and communications board 33. Communications board 33 is contained in housing 30 and includes medium attachment unit (MAU) 34, central processing unit (CPU) 36, communications controller 38, peak detector 40, and analog-to-digital (A/D) converter 42.

Housing 30 has a size to facilitate ease of portability of diagnostic tool 29. For example, housing 30 may be sized such that diagnostic tool 29 is a handheld device.

LCD 31 is contained in housing 30 such that the display is viewable externally by a user of diagnostic tool 29. LCD 31 is used to transmit information to the user relating to operation of diagnostic tool 29.

Diagnostic tool 29 is electrically attached to segment 12 by conductive elements 32. In one embodiment, conductive elements 32 are conductive wires or probes. Conductive elements 32 provide signals from segment 12 to MAU 34. MAU 34 is a transceiver that converts signals from segment 12 so that the signals are usable by the hardware on communications board 33. MAU 34 is a part of the physical layer of the network protocol, and may be an integrated circuit or composed of discrete components.

CPU 36 is connected to MAU 34 via communication controller 38. CPU 36 is a microprocessor-based system such as Motorola 68LC302, Motorola Mcore 2075, Motorola PowerPC 850, Atmel Thumb processor AT91M40800 and others. In one embodiment, CPU 36 is an 8-bit or higher processor.

Communication controller 38 is an application specific integrated circuit (ASIC) chip that serves as an interface between MAU 34 and CPU 36. It transmits and receives encoded Manchester data to and from external analog circuitry connected to segment 12. After receiving the serial data from MAU 34, communication controller 38 decodes the data, forms the data into bytes, strips off the preamble, SD, and ED (and, optionally, the FCS bytes), and provides the message data for the link layer to read.

Peak detector 40 also receives signals from segment 12 via MAU 34. When an amplitude measurement of the signal is desired, CPU 36 instructs A/D converter 42, which is connected to CPU 36 and peak detector 40, to sample the output of peak detector 40 after receiving a SOM. Peak detector 40 holds the signal amplitude of a signal received from segment 12 until an EOA is detected. The output of peak detector 40 is an integer that corresponds to the voltage level of the maximum signal amplitude. A/D converter 42 receives the integer from peak detector 40 and converts the integer into a voltage measurement corresponding to the peak-to-peak amplitude measurement of the signal from segment 12. Information relating to the signal measurement may then be provided to the user of diagnostic tool 29 via LCD 31.

Figure 4:
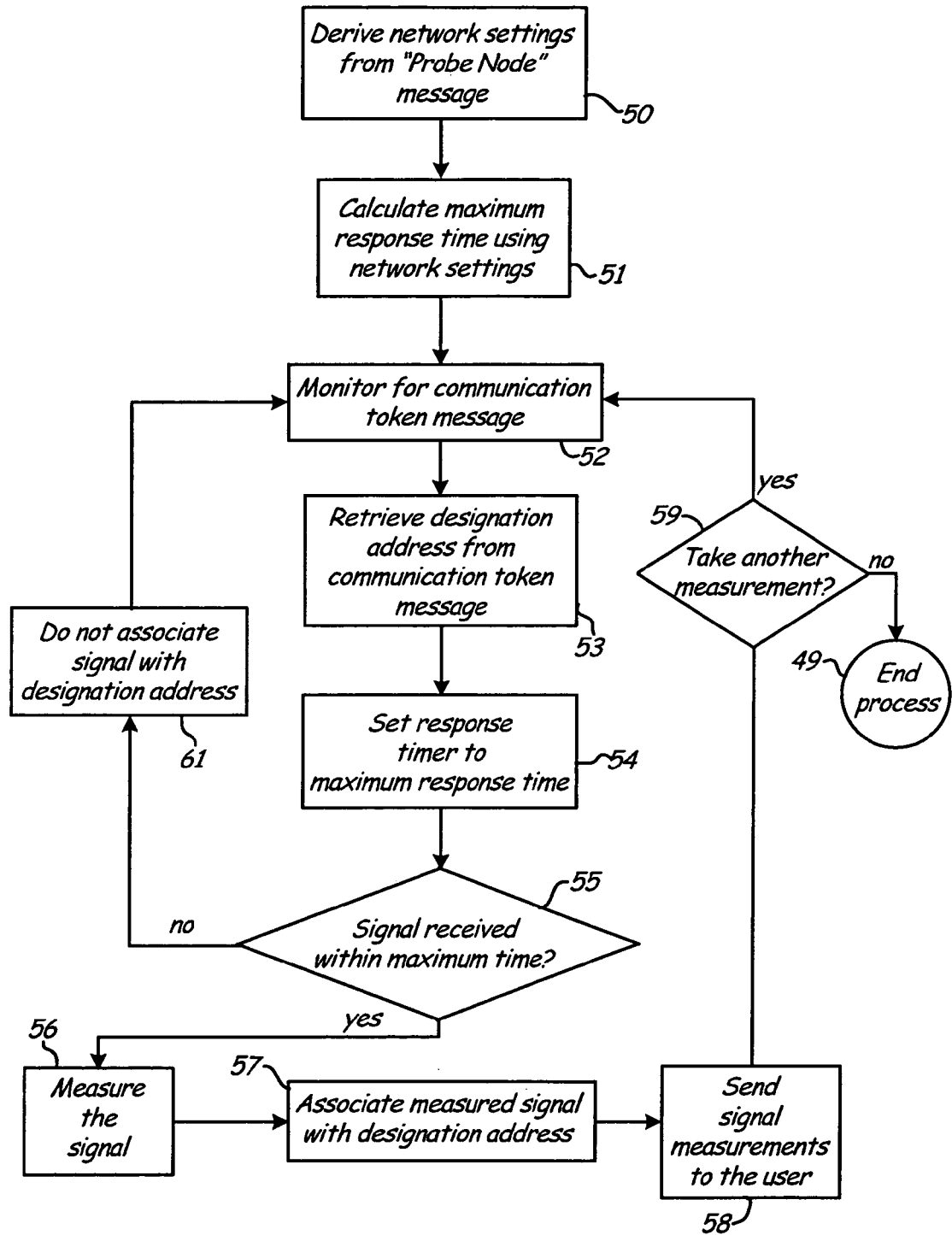
FIG. 4 is a flow diagram for associating a signal with a device communicating on a network according to the present invention.

FIG. 4 is a flow diagram of the steps used by diagnostic tool 29 for associating a designation address of a device connected to segment 12 with a signal measured on segment 12 according to an embodiment of the present invention. This process may be implemented in software run by CPU 36 or in hardware in diagnostic tool 29. In general, diagnostic tool 29 derives the designation address of a device scheduled to communicate next on the network, and associates the next received signal with the designation address if the next received signal is received within the network maximum response time.

Communications controller 38 parses messages on segment 12 to obtain a Probe Node (PN) message. As discussed earlier, the FC byte is the first byte of a DLPDU, and specifies the type of message included in the DLPDU. Thus, communications controller 38 checks the FC byte of each message on the network when searching for the PN message. The PN message contains network settings that are related to, for example, the maximum response time for devices communicating on segment 12. Communications controller 38 derives the network settings from the PN message (step 50). The maximum response time for a device holding a communication token is then calculated from the network settings by communications controller 38 (step 51).

When scheduling a device to communicate on segment 12, LAS 20 passes a communication token to the device on segment 12 via a Pass Token (PT) message. The device scheduled to communicate next is the device that receives the PT message from LAS 20. As described above, PT messages have the designation address of the device scheduled to communicate next encoded in the second byte of the PT DLPDU. Communications controller 38 monitors segment 12 to find the next PT message (step 52). When the next PT message is found, communications controller 38 parses the PT message to retrieve the designation address of the device scheduled to communicate next (step 53). A response timer is then set to the maximum response time (step 54). In one embodiment, the response timer is contained in communications controller 38 and set by CPU 36.

If the next signal is received by LAS 20 within the maximum time (step 55), then a characteristic of the next received signal is measured by A/D converter 42 (step 56). One of the signal characteristics measured is amplitude, which is sampled by A/D converter 42 from peak detector 40. As stated earlier, the amplitude is measured peak-to-peak (p-p), which is the difference between the maximum positive and the maximum negative amplitudes of a device signal. The amplitude of the device signal normally ranges from about 250 mV p-p to about 1.2 V p-p. An amplitude measurement outside of this normal range may be indicative of a problem with the device. For example, a malfunctioning component within a device on segment 12, such as a capacitor, resistor, or microchip, may cause the amplitude of the device signal to be outside the normal range. If the amplitude measurement is outside of the normal amplitude range, it is important to alert the user of diagnostic tool 29 of the potentially problematic device supplying this signal.

Since the device receiving the PT message is scheduled to communicate next, the next signal measured on segment 12 is expected to be from that device. If the next signal measured on segment 12 is received within the maximum time, communications controller 38 associates the measured signal with the designation address retrieved from the PT message (step 57). The measurements are then sent by CPU 36 to the user of diagnostic tool 29 (step 58). In one embodiment, the user of diagnostic tool 29 views the signal measurements on LCD 31. In addition, if any of the amplitude measurements are outside of the normal amplitude range, diagnostic tool 29 produces an output to alert the user of the potentially problematic device. In one embodiment, diagnostic tool 29 provides a character display on LCD 31 to indicate to the user that the measured amplitude is outside of the normal range.

If diagnostic tool 29 is to take another measurement (step 59), then communications controller 38 monitors segment 12 for the next PT message (step 52). Otherwise, the measurement process is ended (step 60). If the next signal measured on segment 12 is not received within the maximum time, the measured signal is not associated with the designation address retrieved from the PT message (step 61).

Figure 5A:
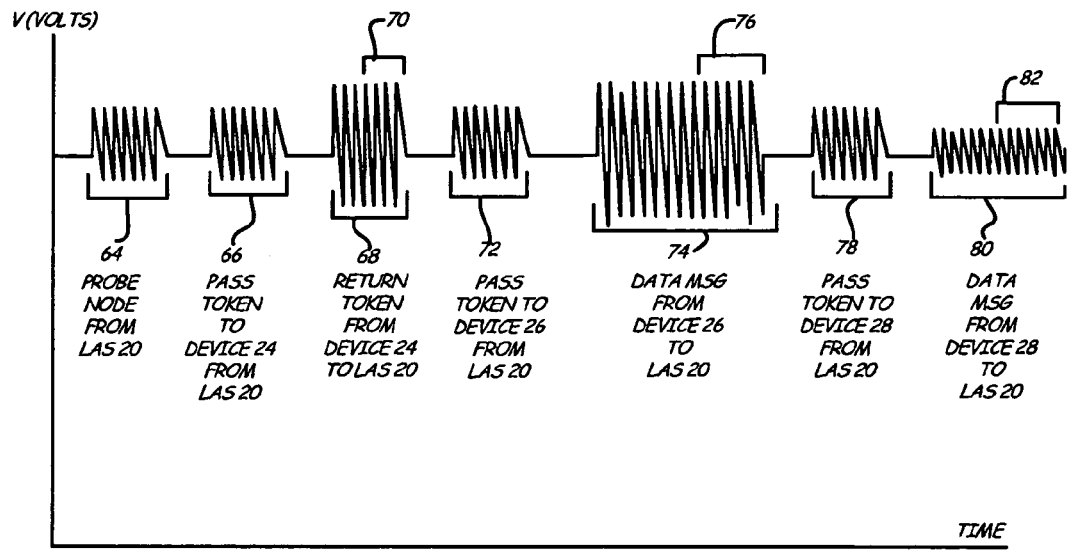
FIG. 5A is a timeline diagram illustrating measurement and processing of a signal according to the present invention when the next scheduled device responds within a maximum response time.

FIG. 5A is a timeline diagram illustrating measurement of a signal when the next scheduled device responds within the maximum response time. Voltage is shown on the vertical axis and time is shown on the horizontal axis.

LAS 20 sends a PN message signal during time 64. The PN message contains network settings that are related to, for example, the maximum response time for devices communicating on segment 12. Network settings are derived by communications controller 38 from this signal. LAS 20 next sends a PT message signal during time 66 to a device connected to segment 12 (e.g., device 24). When device 24 receives the PT message signal, device 24 sends a Return Token (RT) signal during time 68 to LAS 20. Once the signal during time 68 is detected by communications controller 38, a signal measurement during time 70 is taken by A/D converter 42 of the signal during time 68. In one embodiment, the signal measurement during time 70 is taken toward the end of the signal during time 68. The measurement is shown at this point to account for the time that it takes diagnostic tool 29 to detect the signal and to begin the measurement process.

After the measurement is taken and the designation address is associated with the signal measurement, LAS 20 sends a PT message signal during time 72 to another device connected to segment 12 (e.g., device 26). Device 26 responds to LAS 20 with a DLPDU signal during time 74, and a signal measurement of the DLPDU is taken during time 76. The DLPDU includes a RT signal for responding to the PT message. The DLPDU also includes data related to the operation of device 26.

After the signal measurement during time 76 is associated with the designation address of device 26, LAS 20 sends a PT message signal during time 78 to another device connected to segment 12 (e.g., device 28). During time 80, device 28 responds to LAS 20 with a DLPDU signal. A signal measurement of the DLPDU is taken during time 82. The signals illustrated in FIG. 5A show that signals may have different amplitudes because the devices on segment 12 have distinct signal characteristics.

Figure 5B:
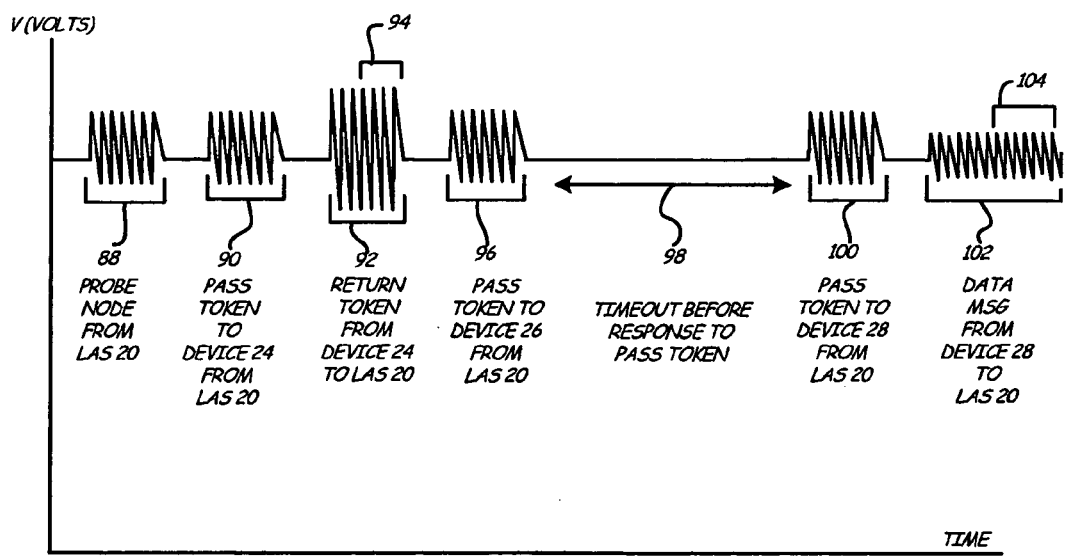
FIG. 5B is a timeline diagram illustrating measurement and processing of a signal according to the present invention when the next scheduled device does not respond within a maximum response time.

FIG. 5B is a timeline diagram illustrating measurement of a signal when the next scheduled device does not responds within the maximum response time. Voltage is shown on the vertical axis and time is shown on the horizontal axis.

LAS 20 sends a PN message signal during time 88. The PN message contains network settings that are related to, for example, the maximum response time for devices communicating on segment 12. Network settings are derived by communications controller 38 from this signal. LAS 20 next sends a PT message signal during time 90 to a device connected to segment 12 (e.g., device 24). When device 24 receives the PT message signal, device 24 sends a RT signal during time 92 to LAS 20. Once the signal is detected by communications controller 38, a signal measurement during time 94 is taken.

When a PT message signal during time 96 is sent to another device connected to segment 12 (e.g., device 26), the maximum response timer elapses before device 26 has responded to the PT message (step 98). When a device does not respond to a PT message, this is indicative that a device is not actively communicating on segment 12. Therefore, if the maximum response timer expires before the signal is sent, a signal measurement is not taken by diagnostic tool 29. After the timer elapses, the device scheduled to communicate next on segment 12 (e.g., device 28) is sent a PT message during time 100. During time 102, device 28 responds to LAS 20 with a DLPDU signal. A signal measurement of the DLPDU is taken during time 104.

The association of a signal measured on segment 12 with the designation address of a device connected to segment 12 has many uses. For instance, diagnostic tool 29 may measure a device's signal, and provide a user with the measurement as well as the address of the device where the signal originated. The user may also be provided with a description of the device where the signal originated. If the measured signal falls outside of a normal network amplitude range, the user immediately knows the source of the measured signal to identify the defective device.

In addition, when a signal is received within the maximum response time, this indicates that the device is actively communicating on segment 12. A dynamic list of devices actively communicating on segment 12, which includes the designation address of each active device, may be created. On the other hand, if the signal is not received within the maximum time, this indicates that the device is not actively communicating on the network. Consequently, the device's designation address, if present on a list of actively communicating devices, may be removed from this list.

In summary, devices communicating on a network cannot easily be associated with a signal using an oscilloscope. Traditionally, the use of an oscilloscope makes it difficult to track the devices communicating on the network and to identify which device has a problem. The present invention is a method of associating a signal on a network with one of a plurality of communication devices connected on the network. The designation address of an active communication device that is scheduled to communicate next on the network is first determined. If the next signal is received within the maximum response time, the signal is associated with the designation address of the device. If the timer expires before receipt of the next signal, the signal is not associated with a designation address.

Although the present invention has been described with reference to preferred embodiments, workers skilled in the art will recognize that changes may be made in form and detail without departing from the spirit and scope of the invention.

The invention claimed is:

1. A method for associating a signal measured on a network with one of a plurality of communication devices connected to the network, the method comprising:
   monitoring scheduled network communications;
   determining a designation address of an active communication device that is scheduled to communicate next on the network;
   measuring an amplitude of a next received signal on the network;
   associating the next received signal on the network with the designation address of the active communication device if the next received signal is received within a maximum response time; and producing an output indicating an error associated with the designation address if the measured amplitude of the next received signal is outside a normal network amplitude range.

2. The method of claim 1, wherein the active communication device receives a communication token message when it is scheduled to communicate next on the network.

3. The method of claim 2, wherein the designation address is derived from the communication token message.

4. The method of claim 1, wherein the maximum response time is derived from network settings.

5. The method of claim 4, wherein the network settings are derived from information contained in a device probe message on the network.

6. A method for identifying a defective device on a network, the method comprising:
   determining a designation address of an active communication device that is scheduled to communicate next on the network by monitoring network communication;
   measuring an amplitude of a next received signal on the network;
   associating the next received signal with the designation address of the active communication device if the next received signal is received within a maximum response time; and
   producing an output indicating that the active communication device is defective when the measured amplitude is outside a normal network amplitude range.

7. The method of claim 6, wherein the active communication device receives a communication token message when it is scheduled to communicate next on the network.

8. The method of claim 7, wherein the designation address is derived from the communication token message.

9. The method of claim 6, wherein the maximum response time is derived from network settings.

10. The method of claim 9, wherein the network settings are derived from information contained in a device probe message on the network.

11. The method of claim 6, wherein the output is produced when the measured amplitude exceeds the normal network amplitude range.

12. The method of claim 6, wherein the output is produced when the measured amplitude is less than the normal network amplitude range.

13. A method for tracking devices that are active on a communication network, the method comprising:
   monitoring scheduled network communication;
   determining a designation address of an active communication device that is scheduled to communicate next on the network;
   associating a next received communication with the designation address of the active communication device if the next received communication is received within a maximum response time;
   storing the designation address of the active communication device in a list containing the designation addresses of all devices that are active on the network;
   measuring the amplitude of the next received communication; and
   producing an output associated with the designation address if the amplitude is outside a normal range.

14. The method of claim 13, wherein the active communication device receives a communication token message when it is scheduled to communicate next on the network.

15. The method of claim 14, wherein the designation address is derived from the communication token message.

16. The method of claim 13, wherein the maximum response time is derived from network settings.

17. The method of claim 16, wherein the network settings are derived from information contained in a device probe message on the network.

18. The method of claim 13, wherein the designation address of the active communication device is removed from the list if the next received signal is not received within the maximum response time.

19. A diagnostic tool for connecting to a communication medium, the diagnostic tool comprising:
   a medium attachment unit (MAU) connected to the communication medium which is operable to receive signals from the communication medium via the conductive elements;
   a communication controller connected to the MAU which is operable to determine a designation address of an active communication device that is scheduled to communicate next on the network by monitoring network communication; and
   a processor connected to the communication controller which is operable to associate a next received signal on the network with the designation address of the active communication device if the next received signal is received within a maximum response time and produce an output when a measured amplitude of the next received signal is outside a normal amplitude range.

20. The diagnostic tool of claim 19, wherein the address is derived from a communication token message.

* * * * *